United States Patent
Yamamoto et al.

(10) Patent No.: US 7,555,509 B2
(45) Date of Patent: Jun. 30, 2009

(54) PARALLEL FAST FOURIER TRANSFORMATION METHOD OF CONCEALED-COMMUNICATION TYPE

(75) Inventors: Yusaku Yamamoto, Nagoya (JP); Ken Naono, Tachikawa (JP)

(73) Assignee: Hitachi, Ltd., Tokyo (JP)

(*) Notice: Subject to any disclaimer, the term of this patent is extended or adjusted under 35 U.S.C. 154(b) by 837 days.

(21) Appl. No.: 10/785,110

(22) Filed: Feb. 25, 2004

(65) Prior Publication Data

US 2004/0236810 A1 Nov. 25, 2004

(30) Foreign Application Priority Data

May 23, 2003 (JP) ............................. 2003-145607

(51) Int. Cl.
G06F 17/14 (2006.01)
(52) U.S. Cl. ....................................... 708/401; 708/404
(58) Field of Classification Search ................. 708/401, 708/404, 406
See application file for complete search history.

(56) References Cited

U.S. PATENT DOCUMENTS

| | | | | |
|---|---|---|---|---|
| 5,548,761 | A * | 8/1996 | Balasundaram et al. | 717/159 |
| 5,751,616 | A * | 5/1998 | Hegland et al. | 708/401 |
| 5,754,438 | A * | 5/1998 | Naono et al. | 702/76 |
| 5,887,186 | A | 3/1999 | Nakanishi | |
| 2002/0065862 | A1 * | 5/2002 | Nakanishi | 708/401 |

FOREIGN PATENT DOCUMENTS

| | | |
|---|---|---|
| JP | 07-271760 | 3/1994 |
| JP | 11-066041 | 8/1997 |
| JP | 2000-200261 | 12/1998 |

OTHER PUBLICATIONS

Takahashi, Daisuku, "Parallel FFT Algorithms for the Distributed-Memory Parallel Computer Hitachi SR8000", Joint Symposium on Parallel Processing 2000, Jun. 1, 2000, pp. 91-93, [CSDB] CS-NG-2001-00293-012, Abstract in English.

(Continued)

Primary Examiner—Chuong D Ngo
(74) Attorney, Agent, or Firm—Reed Smith LLP; Juan Carlos A. Marquez, Esq.

(57) ABSTRACT

In a 3-dimensional fast Fourier transformation implemented by using a parallel-processing computer, an overhead caused by transfers of data between processors employed in the computer is reduced for the purpose of increasing the efficiency of processing parallelism. In order to reduce the overhead, data is divided into data elements each having an even X coordinate and data elements each having an odd X coordinate. In processing 34, the date elements each having an even coordinate are subjected to the transformation in the Y direction while the date elements each having an odd X coordinate are being subjected to a process of permutation among the processors at the same time. In processing 35, on the other hand, the data elements each having an odd X coordinate are subjected to the transformation in the X direction while the data elements each having even coordinate are being subjected to the process of permutation among the processors at the same time. As a result, the communication time it takes to carry out the process of permutation among the processors can be concealed behind the processing time so that the efficiency of the processing parallelism can be increased over the processing efficiency of the conventional method.

6 Claims, 8 Drawing Sheets

OTHER PUBLICATIONS

G.H. Golub et al, "The Fast Fourier Transform—Matrix Computations", 3$^{rd}$ Edition, The Johns Hopkins University Press, 1996, pp. 189-192.

V. Kumar et al., Fast Fourier Transform—Introduction to Parallel Computing:, published by The Benjamin/Cummings Publishing company, 1994, pp. 377-406.

* cited by examiner

PARALLEL FAST FOURIER TRANSFORMATION METHOD OF CONCEALED-COMMUNICATION TYPE

FIELD OF THE INVENTION

The present invention relates to a method to carry out a fast Fourier transformation by using a parallel-processing computer having a distributed-memory configuration.

BACKGROUND OF THE INVENTION

Large-scale simulations each handling up to several millions of variables are required in scientific and technical computations such as calculations to find characteristics of a semiconductor device, calculations to determine states of electrons and calculations to forecast the weather. As a means for dealing with such large-scale problems, a parallel-processing computer, specially, a parallel-processing computer having the so-called distributed-memory configuration is powerful. The parallel-processing computer having a distributed-memory configuration is a system comprising a plurality of processors connected to each other by a network as processors each having its own memory. In comparison with the conventional sequential-processing computer, the parallel-processing computer parallel-processing computer having a distributed-memory configuration offers an advantage of allowing the peak performance thereof to be raised to as high a level as desired by increasing the number of processors employed therein.

In the parallel-processing computer having a distributed-memory configuration, pieces of data serving as an object of calculation are stored in memories distributed among the processors so that the processors are capable of carrying out computations on the pieces of data in parallel processing. If a specific one of the processor requires data owned by another processor in the course of processing, the specific processor must wait for the required data to be transferred from the other processor before continuing the processing. Thus, in general, the parallel-processing computer having a distributed-memory configuration incurs an overhead of time required for transferring data from one processor to another in addition to the processing time. For this reason, in order to increase the efficiency of computation, it is necessary to adopt a computation method exhibiting such a high degree of processing parallelism that computation can be done by incurring only a shortest possible period of time required for communication between processors. In addition, a large number of parallel-processing computers having a distributed-memory configuration includes a mechanism, which is used for transferring data from a specific one of the processors to another processor while the specific processor is processing other data. In this configuration, if it is possible to contrive a computation method capable of carrying out processing of data and transfers of other data at the same time, the time it takes to transfer other data can be concealed behind the processing time so that the efficiency of computation can be raised.

The Fourier transformation is one of processes carried out frequently in a scientific calculation. The Fourier transformation is a process of expressing a function f(x) having complex values defined in an interval of real numbers as a superposition of a complex exponential function exp(ikx). In an implementation on a computer, only a finite number of handled points can be handled so that the Fourier transformation becomes a process of expressing a series of points $f_0, f_1, \ldots, f_{N-1}$ each representing a complex number as a superposition of N complex exponential functions exp($2\pi ikj/N$) where symbol k represents every integer in the range $0, 1, \ldots, (N-1)$, symbol i denotes the imaginary-number unit and symbol $\pi$ denotes the ratio of the circumference of a circle to the diameter thereof as follows:

$$\exp(2\pi ikj/N)$$

$$f_j = \Sigma_{k=0}^{N-1} c_k \exp(2\pi ikj/N)$$

where symbol j represents every integer in the range $0, 1, \ldots, (N-1)$. That is to say, for the given $f_0, f_1, \ldots, f_{N-1}$, the Fourier transformation is a process of finding superposition coefficients $c_0, c_1, \ldots, c_{N-1}$. As commonly known, the superposition coefficients $c_0, c_1, \ldots, c_{N-1}$ can be found from the following equation:

$$c_k = (1/N) \Sigma_{j=0}^{N-1} f_j \exp(-2\pi ikj/N)$$

where symbol k represents every integer in the range $0, 1, \ldots, (N-1)$. If the calculation is carried out on the basis of the above definitions, however, N equations each comprising N terms must be solved. Thus, in addition to calculation of the complex exponential functions exp($-2\pi ikj/N$), additions and multiplications of complex numbers must be carried out $N^2$ times. In order to solve this problem of much calculation, in actuality, a technique known as a fast Fourier transformation is adopted widely. The fast Fourier transformation is a technique for reducing the amount of computation to an order of NlogN by devising an algorithm for the Fourier transformation. The fast Fourier transformation is described in detail in documents such as a reference authored by G. Golub and C. F. van Loan with a title of "Matrix Computations", $3^{rd}$ edition, published by The John Hopkins University Press, 1996, pp. 189-192.

The Fourier transformation described above is called a 1-dimensional Fourier transformation. However, a 3-dimensional Fourier transformation is applied to computations such as the calculations to find characteristics of a semiconductor device, the calculations to determine states of electrons and the calculations to forecast the weather. The 3-dimensional Fourier transformation is a process to express complex-number data $\{f_{jx, jy, jz}\}$ having 3 subscripts $j_x$, $j_y$ and $j_z$ where symbol $j_x$ represents every integer in the range $0, 1, \ldots, (N_x-1)$, symbol $j_y$ represents every integer in the range $0, 1, \ldots, (N_y-1)$ and symbol $j_z$ represents every integer in the range $0, 1, \ldots, (N_z-1)$ as a superposition of $N_x \times N_y \times N_z$ complex exponential functions exp($-2\pi ik_x j_x/N_x$) exp($-2\pi ik_y j_y/N_y$) exp($-2\pi ik_z j_z/N_z$) where symbol $k_x$ represents every integer in the range $0, 1, \ldots, (N_x-1)$, symbol $k_y$ represents every integer in the range $0, 1, \ldots, (N_y-1)$ and symbol $k_z$ represents every integer in the range $0, 1, \ldots, (N_z-1)$ as follows:

$$f_{jx, jy, jz} = \Sigma_{kx=0}^{Nx-1} \Sigma_{ky=0}^{Ny-1} \Sigma_{kz=0}^{Nz-1}$$

$$c_{kx, ky, kz} \exp(-2\pi ik_x j_x/N_x) \exp(-2\pi ik_y j_y/N_y) \exp(-2\pi ik_z j_z/N_z)$$

where symbol $j_x$ represents every integer in the range $0, 1, \ldots, (N_x-1)$, symbol $j_y$ represents every integer in the range $0, 1, \ldots, (N_y-1)$ and symbol $j_z$ represents every integer in the range $0, 1, \ldots, (N_z-1)$. That is to say, for the given $\{f_{jx, jy, jz}\}$, the 3-dimensional Fourier transformation is a process of finding a superposition coefficient $\{C_{kx, ky, kz}\}$. As commonly known, the superposition coefficient $\{C_{kx, ky, kz}\}$ can be found from the following equation:

$$c_{kx, ky, kz} = \Sigma_{jx=0}^{Nx-1} \Sigma_{jy=0}^{Ny-1} \Sigma_{jz=0}^{Nz-1}$$

$$f_{jx, jy, jz} \exp(-2\pi ik_x j_x/N_x) \exp(-2\pi ik_y j_y/N_y) \exp(-2\pi ik_z j_z/N_z)$$

where symbol $k_x$ represents every integer in the range 0, 1, ..., $(N_x-1)$, symbol $k_y$ represents every integer in the range 0, 1, ..., $(N_y-1)$ and symbol $k_z$ represents every integer in the range 0, 1, ..., $(N_z-1)$.

Furthermore, it is easy to show that the above equation can be solved by sequentially carrying out the following three transformations:

<Transformation in the Y Direction>

$$c_{jx, ky, jz}^{(1)} = \Sigma_{jy=0}^{Ny-1} f_{jx, jy, jz} \exp(-2\pi i k_y j_y/N_y)$$

where symbol $j_x$ represents every integer in the range 0, 1, ..., $(N_x-1)$, symbol $k_y$ represents every integer in the range 0, 1, ..., $(N_y-1)$ and symbol $j_z$ represents every integer in the range 0, 1, ..., $(N_z-1)$.

<Transformation in the X Direction>

$$c_{kx, ky, jz}^{(2)} = \Sigma_{jx=0}^{Nx-1} c_{jx, ky, jz}^{(1)} \exp(-2\pi i k_x j_x/N_x)$$

where symbol $k_x$ represents every integer in the range 0, 1, ..., $(N_x-1)$ symbol $k_y$ represents every integer in the range 0, 1, ..., $(N_y-1)$ and symbol $j_z$ represents every integer in the range 0, 1, ..., $(N_z-1)$.

<Transformation in the Z Direction>

$$C_{kx, ky, kz} = \Sigma_{jz=0}^{Nz-1} c_{kx, ky, jz}^{(2)} \exp(-2\pi i k_z j_z/N_z)$$

where symbol $k_x$ represents every integer in the range 0, 1, ..., $(N_x-1)$, symbol $k_y$ represents every integer in the range 0, 1, ..., $(N_y-1)$ and symbol $k_z$ represents every integer in the range 0, 1, ..., $(N_z-1)$.

Figure 2:
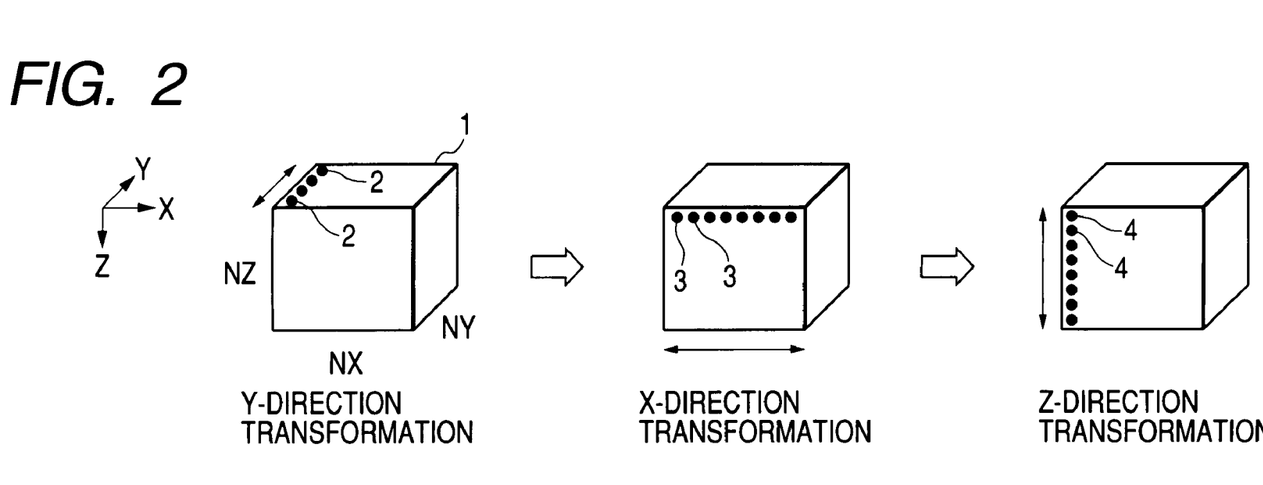
FIG. 2 is a diagram showing the conventional 3-dimensional fast Fourier transformation method.

As is obvious from the above equations, the transformation in the Y direction is a 1-dimensional Fourier transformation carried out on $N_y$ pieces of data having the same subscripts $j_x$ and $j_z$. Then, subscripts $j_x$ and $j_z$ are varied, being used in carrying out such a transformation $N_x \times N_z$ times in order to complete the transformation in the Y direction. The transformations in the X and Z directions are carried out in the same way as the transformation in the Y direction. Thus, as indicated by reference numeral 1 shown in FIG. 2, if pieces of 3-dimensional data $\{f_{jx, jy, jz}\}$ are arranged to form a rectangular solid with dimensions of $N_x \times N_y \times N_z$ where symbols $N_x$, $N_y$ and $N_z$ denote the lengths of its sides, the transformation in the Y direction is a 1-dimensional Fourier transformation carried out on $N_y$ pieces of data 2, which are parallel to the Y axis. By the same token, the transformation in the X direction is a 1-dimensional Fourier transformation carried out on $N_x$ pieces of data 3, which are parallel to the X axis. Likewise, the transformation in the Z direction is a 1-dimensional Fourier transformation carried out on $N_z$ pieces of data 4, which are parallel to the Z axis. It is obvious that, by adoption of this method of computation, in the transformation in the Y direction, calculations for sets of data with different X coordinates or different Z coordinates can be carried out concurrently. By the same token, it is also obvious that, in the transformation in the X direction, calculations for sets of data with different Y coordinates or different Z coordinates can be carried out concurrently. Similarly, it is obvious as well that, in the transformation in the Z direction, calculations for sets of data with different X coordinates or different Y coordinates can be carried out concurrently.

Traditionally, a method utilizing the parallelism described above is generally adopted in execution of the 3-dimensional fast Fourier transformation using a parallel-processing computer having a distributed-memory configuration. An example of such a method is referred to as a permutation algorithm, which is an efficient technique of reducing the amount of data transferred between processors to a minimum.

Figure 3:
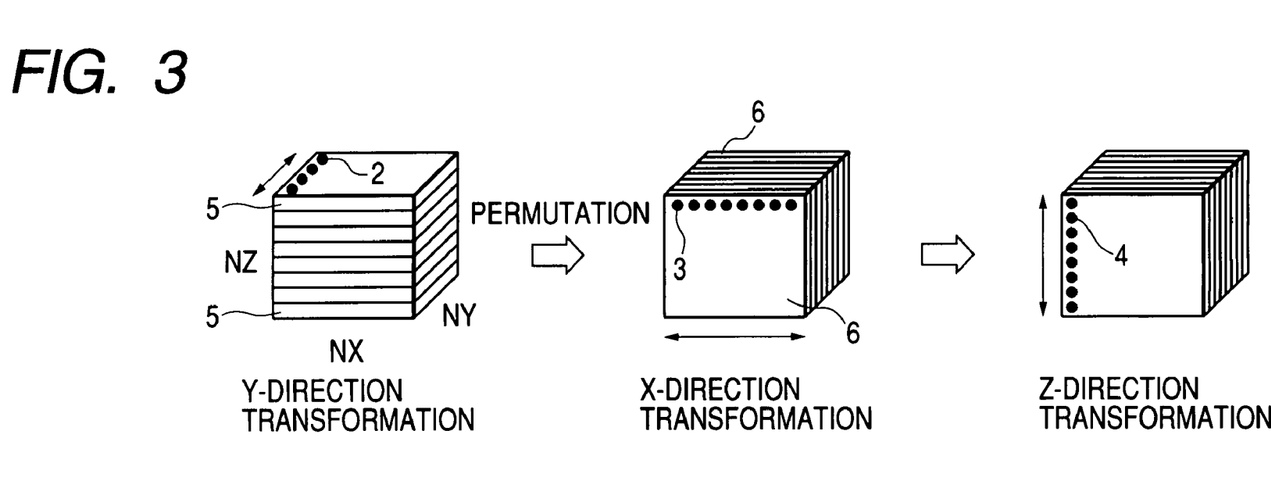
FIG. 3 is a diagram showing the conventional parallel 3-dimensional fast Fourier transformation method.

This efficient technique is described in detail in documents such as a reference authored by V. Kumar, A. Grama, A. Gupta and G. Karypis with a title of "Introduction to Parallel Computing", published by The Benjamin/Cummings Publishing Company, 1994, pp. 377-406. In accordance with this method, as shown in FIG. 3, first of all, 3-dimensional data is split into as many pieces of data 5 each arranged on a plane perpendicular to the Z axis as processors, and the pieces of data 5 are each stored in a memory provided for one of the processors in a distributed-memory configuration. Then, in this state, a transformation in the Y direction is carried out. It is obvious that, since only 1 processor has all $N_y$ pieces of data 2 required in the transformation in the Y direction in itself in this state, the transformation in the Y direction can be carried out without the need to transfer data between processors. After the transformation in the Y direction is completed, the technique of splitting data is changed. This time, the 3-dimensional data is split into as many pieces of data 6 each arranged on a plane perpendicular to the Y axis as processors, and the pieces of data 6 are each stored in a memory provided for one of the processors in a distributed-memory configuration. In consequence, every processor needs to carry out a process to transfer data to all other processors. This process is referred to as permutation. After the permutation process is completed, however, each processor has all $N_x$ pieces of data 3 required in the transformation in the X direction in itself. Thus, the transformation in the X direction can be carried out without the need to transfer data between processors. In addition, also in the case of the transformation in the Z direction, each processor has all $N_z$ pieces of data 4 required in the transformation in the Z direction in itself. Thus, the transformation in the Z direction can be carried out without the need to transfer data between processors. In this way, the 3-dimensional Fourier transformation can be completed. The above description explains the use of a parallel-processing computer having a distributed-memory configuration to implement a method of carrying out the 3-dimensional fast Fourier transformation.

In accordance with the parallel computing method based on the permutation algorithm described above, the transformations in the Y, X and Z directions can be carried out in processors in a completely independent way. In the permutation process carried out in the course of computing, however, every processor needs to transfer data to all other processors. In general, in a parallel-processing computer having a distributed-memory configuration, it takes much time to transfer data in comparison with the processing time itself. This phenomenon has been becoming obvious more and more as the processing speed of the contemporary processor is increased. In addition, in recent years, PC clusters are widely used. A PC cluster is a number of personal computers (PCs) connected to each other by using a network such as the Internet (a registered trademark). In the case of a PC cluster, the power to transfer data among the personal computers is low in comparison with a parallel-processing computer having a distributed-memory configuration. Thus, in particular, the power to transfer data among the personal computers most likely becomes a bottleneck of the processing time. As is obvious from the background described above, in many cases, the conventional method based on the permutation algorithm does not assure sufficient parallel-processing performance in the use of a parallel-processing computer having a distributed-memory configuration for execution of the 3-dimensional fast Fourier transformation. It is thus an object of the present invention to solve this problem.

SUMMARY OF THE INVENTION

In order to achieve the object cited above, in accordance with the present invention, the Y-direction and X-direction transformations based on the permutation algorithm are each split into two partial processes and the processing order is changed so as to allow communications and calculative processing to overlap each other. For this reason, the present invention focuses on the following transformation properties:

(1) The transformation in the Y direction exhibits parallelism with respect to the transformation in the X direction. Thus, each processor is capable of carrying out a transformation on $N_x$ sets of data as a transformation to be executed by itself in any arbitrary order.

(2) The transformation in the X direction comprises $\log_2(N_x)$ steps. At the first $\log_2(N_x-1)$ steps of the steps composing the transformation in the X direction, data elements each having an even X coordinate are processed only in conjunction with data elements each also having an even X coordinate whereas data elements each having an odd X coordinate are processed only in conjunction with data elements each also having an odd X coordinate.

Figure 4:
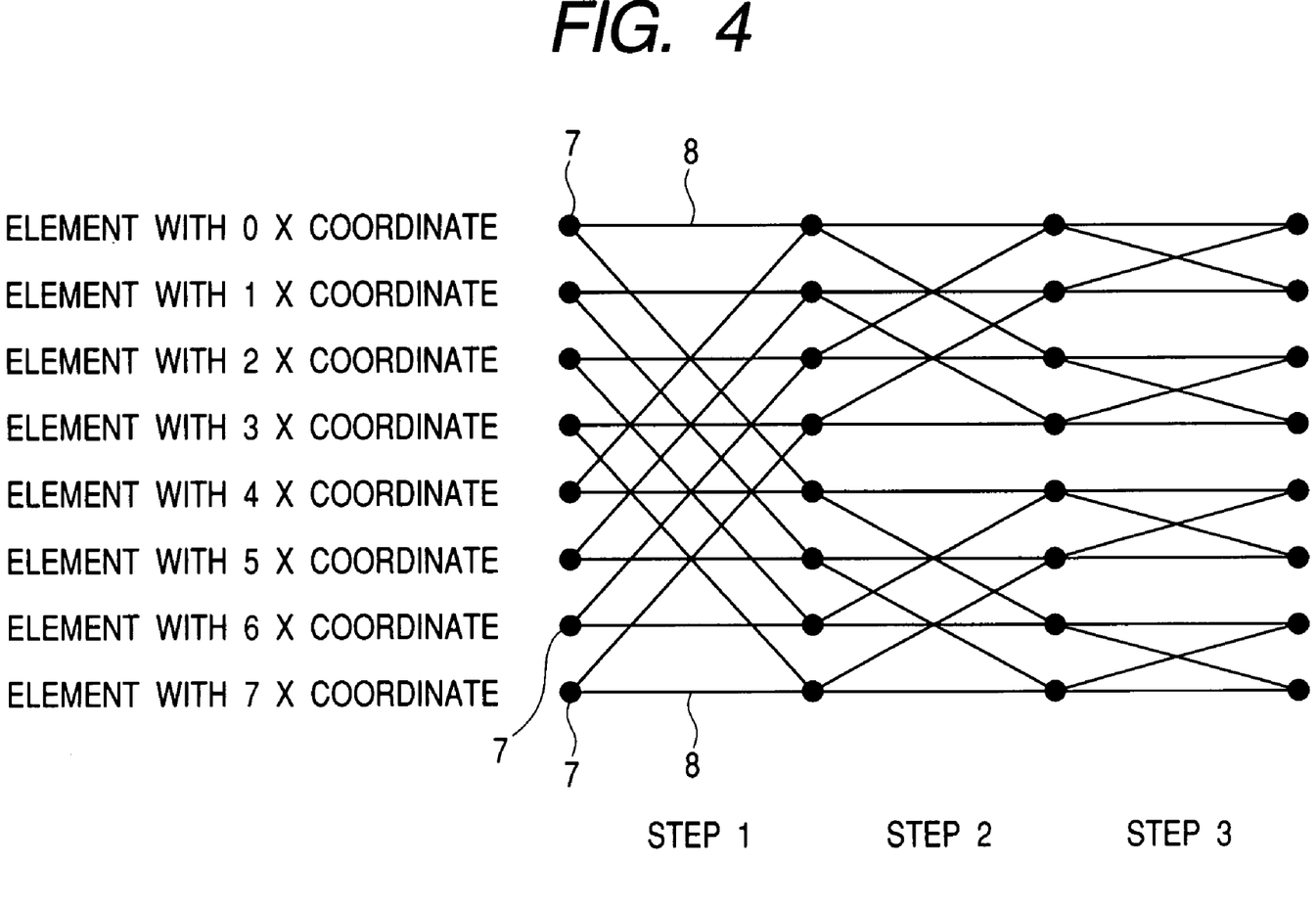
FIG. 4 is a diagram showing dependence relations of data in the transformation carried out in the X direction.

The case of $N_x=8$ is taken as an example. In this case, the flow of a computation carried out on a data set in the transformation in the X direction is shown in FIG. 4. In the flow diagram, eight circles 7 arranged vertically each denote 1 data element and a line 8 connecting circles 7 indicates that a computation of a value of the circle 7 on the right end of the line 8 requires the value of the circle 7 on the left end of the line 8. As is obvious from the figure, at the first $\log_2(N_x-1)=2$ steps of the transformation, data elements each having an even X coordinate are processed only in conjunction with data elements each also having an even X coordinate whereas data elements each having an odd X coordinate are processed only in conjunction with data elements each having also an odd X coordinate. Accordingly, it is clear that transformation property (2) described above holds true. This transformation property applies not only to the special case of $N_x=8$, but also to general cases.

If the two properties, i. e., properties (1) and (2) described above, are utilized, the Y-direction and X-direction transformations based on the permutation algorithm can be divided into the following 5 pieces of processing:

<Processing 1>
A transformation in the Y direction is carried out only on data elements each having an even X coordinate.

<Processing 2>
A transformation in the Y direction is carried out only on data elements each having an odd X coordinate. At the same time, a permutation process is carried out only on data elements each having an even X coordinate.

<Processing 3>
The first $\log_2(N_x-1)$ steps of the transformation in the X direction are executed only on data elements each having an even X coordinate. At the same time, a permutation process is carried out only on data elements each having an odd X coordinate.

<Processing 4>
The first $\log_2(N_x-1)$ steps of the transformation in the X direction are executed only on data elements each having an odd X coordinate.

<Processing 5>
The last step of the transformation in the X direction is executed.

Figure 5:
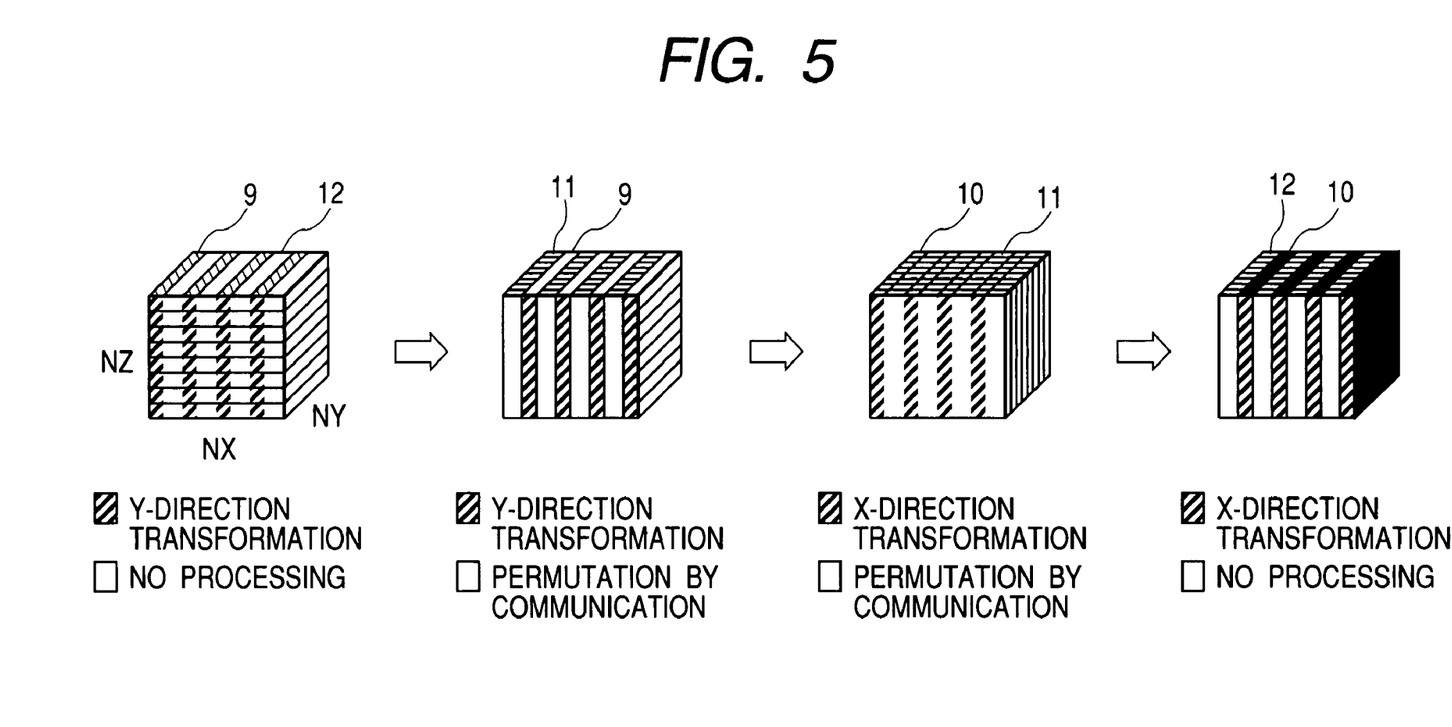
FIG. 5 is a diagram showing a computation technique of Y-direction and X-direction transformations adopting a parallel 3-dimensional fast Fourier transformation method according to the present invention.

The states of processing 1 to processing 4 according to the present invention are shown in FIG. 5. In the figure, hatched portions 9 and 10 represent data elements being subjected to transformation calculations, a gray portion 11 represents data elements being subjected to data transfers and a white portion 12 represents data elements not being subjected to any operations. A line in the rectangular solid represents division of data into data portions each assigned to a processor. In accordance with the computation method provided by the present invention, in processing 2, while a transformation in the Y direction is being carried out on data elements each having an odd X coordinate, a permutation process can be carried out only on data elements each having an even X coordinate. In processing 3, on the other hand, while a transformation in the Y direction is being carried out on data elements each having an even X coordinate, a permutation process can be carried out only on data elements each having an odd X coordinate. In this way, the time it takes to transfer data can be concealed behind the processing time and, hence, the efficiency of computation can be increased.

DETAILED DESCRIPTION OF THE PREFERRED EMBODIMENTS

First Embodiment (1) Schematic Configuration of the Computer

An embodiment and principle of the present invention will be described in detail by referring to diagrams. The embodiment implements a parallel-processing computer having a distributed-memory configuration as a computer for solving partial-differential equations by using a 3-dimensional Fourier transformation. To be more specific, the parallel-processing computer having a distributed-memory configuration is used as a means for running a simulation. In this particular case, as a typical simulation, calculations for weather forecasting are explained.

Figure 6:
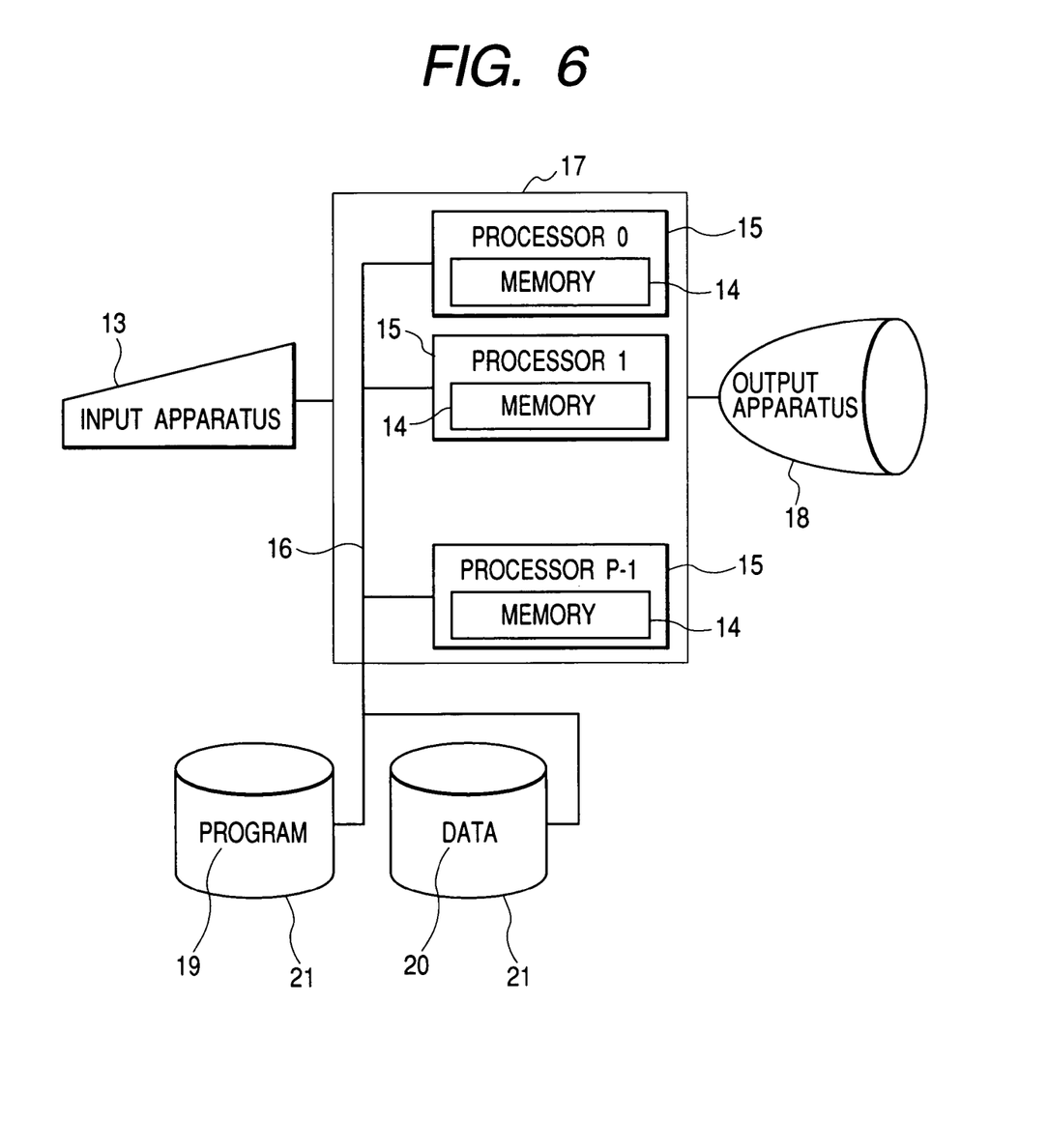
FIG. 6 is a diagram showing the configuration of a parallel-processing computer having a distributed-memory configuration as a computer to which the present invention is to be applied.

FIG. 6 is a diagram showing a parallel-processing computer system for executing a parallel-processing program implementing a computation method provided by the present invention. As shown in the figure, the parallel-processing computer system comprises an input apparatus 13, a processing apparatus 17, an output apparatus 18 and an external storage apparatus 21. The input apparatus 13 is an apparatus for inputting parameters such as the shape of computation area, initial conditions and material constants. The processing apparatus 17 comprises P processors 15 and a network 16. The processors 15 each have a memory 14. The network 16 is used for transferring data between the memories 14 employed in the processors 15. The output apparatus 18 is an apparatus for outputting results of computation. The external storage apparatus 21 is an apparatus for storing a program 19 and data 20. Data can be transferred between the memories 14 employed in the processors 15 at the same time as processing carried out by the processors 15.

(2) 3-Dimensional Parallel-Processing Fast Fourier Transformation Based on the Conventional Method By using mathematical expressions, the following description explains the principle of the 3-dimensional fast Fourier transformation executed on a parallel-processing computer having a distributed-memory configuration. The 3-dimensional Fourier transformation is a process to find $N_x \times N_y \times N_z$ pieces of complex output data $\{C_{kx, ky, kz}\}$ from $N_x \times N_y \times N_z$ pieces of complex input data $\{f_{jx, jy, jz}\}$ by using Eq. (1) given as follows:

$$c_{kx, ky, kz} = \sum_{jx=0}^{Nx-1} \sum_{jy=0}^{Ny-1} \sum_{jz=0}^{Nz-1} f_{jx, jy, jz} \exp(-2\pi i k_x j_x/N_x) \exp(-2\pi i k_y j_y/N_y) \exp(-2\pi i k_z j_z/N_z) \quad (1)$$

where symbol $k_x$ denotes every integer in the range $0, 1, \ldots, (N_x-1)$, symbol $k_y$ denotes every integer in the range $0, 1, \ldots, (N_y-1)$ and symbol $k_z$ denotes every integer in the range $0, 1, \ldots, (N_z-1)$.

It is readily obvious that Eq. (1) can be solved by sequentially carrying out transformations in the Y, X and Z directions, which are expressed by Eqs. (2), (3) and (4) respectively as follows:

$$c_{jx, ky, jz}^{(1)} = \sum_{jy=0}^{Ny-1} f_{jx, jy, jz} \exp(-2\pi i k_y j_y/N_y) \quad (2)$$

where symbol $j_x$ denotes every integer in the range $0, 1, \ldots, (N_x-1)$, symbol $k_y$ denotes every integer in the range $0, 1, \ldots, (N_y-1)$ and symbol $j_z$ denotes every integer in the range $0, 1, \ldots, (N_z-1)$.

$$c_{kx, ky, jz}^{(2)} = \sum_{jx=0}^{Nx-1} c_{jx, ky, jz}^{(1)} \exp(-2\pi i k_x j_x/N_x) \quad (3)$$

where symbol $k_x$ denotes every integer in the range $0, 1, \ldots, (N_x-1)$, symbol $k_y$ denotes every integer in the range $0, 1, \ldots, (N_y-1)$ and symbol $j_z$ denotes every integer in the range $0, 1, \ldots, (N_z-1)$.

$$c_{kx, ky, kz} = \sum_{jz=0}^{Nz-1} C_{kx, ky, jz}^{(2)} \exp(-2\pi i k_z j_z/N_z) \quad (4)$$

where symbol $k_x$ denotes every integer in the range $0, 1, \ldots, (N_x-1)$, symbol $k_y$ denotes every integer in the range $0, 1, \ldots, (N_y-1)$ and symbol $k_z$ denotes every integer in the range $0, 1, \ldots, (N_z-1)$.

Figure 7:
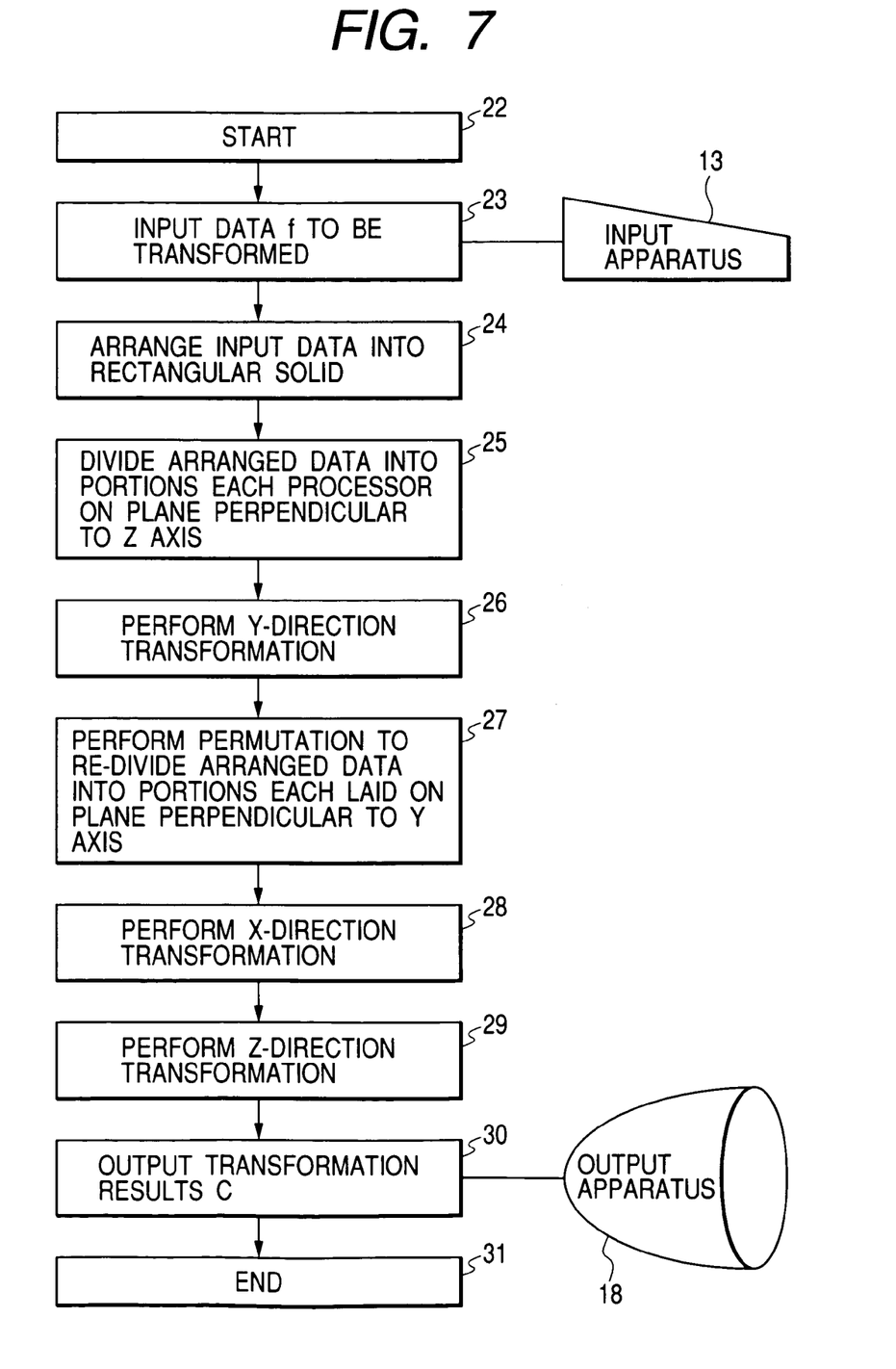
FIG. 7 shows a flowchart representing the conventional parallel 3-dimensional fast Fourier transformation method.

These transformations are carried out in the parallel-processing computer having a distributed-memory configuration by performing $N_x \times N_z$ independent transformations expressed by Eq. (2), $N_y \times N_z$ independent transformations expressed by Eq. (3) and $N_x \times N_y$ independent transformations expressed by Eq. (4). A computation method based on this concept is the permutation algorithm described in a paragraph with a title of 'Background of the Invention.' FIG. 7 shows a flowchart representing a computation based on the permutation algorithm. The computation mainly comprises the following four processes:

<Transformation in the Y Direction>

In processing 23 of the flowchart shown in FIG. 7, 3-dimensional data $f_{jx, jy, jz}$ is received from the input apparatus. In the next processing 24, the data is arranged to form a rectangular solid. In the next processing 25, the data is divided into as many data portions each located on a plane perpendicular to the Z axis as processors and the data portions are each stored in a memory provided for one of the processors in a distributed-memory configuration.

As a technique to divide data, it is possible to adopt one of a variety of methods such as a block division method and a cyclic division method. For details of the data division method, refer to a reference authored by V. Kumar, A. Grama, A. Gupta and G. Karypis with a title of "Introduction to Parallel Computing," published by The Benjamin/Cummings Publishing Company in 1994. In accordance with the block division method, for example, processor p where $0 \leq p \leq (P-1)$ is designated as a processor having $(N_x \times N_y \times N_z)/P$ pieces of data with a Z coordinate $j_z$ satisfying the following relation:

$$(N_z/P) \times p \leq j_z \leq (N_z/P) \times (p+1)-1$$

With the data divided into data portions as described above, in the next processing 26, each processor carries out a transformation in the Y direction on a data portion stored in a memory provided for the processor in accordance with Eq. (2).

<Permutation Process>

In the next processing 27, the data is divided into as many data portions each located on a plane perpendicular to the Y axis as the processors as indicated by reference numeral 6 in FIG. 3, and the data portions are each stored in a memory provided for one of the processors in a distributed-memory configuration. Also in this case, as a technique to divide data, it is possible to adopt one of a variety of methods. In accordance with the block division method, for example, processor p where $0 \leq p \leq (P-1)$ is designated as a processor having $(N_x \times N_y)/(P \times N_z)$ pieces of data with a Y coordinate $k_y$ satisfying the following relation:

$$(N_y/P) \times p \leq k_y \leq (N_y/P) \times (p+1)-1$$

In order to implement the modified data division method described above, processor p transfers some of its data, which exists in processor p after the transformation carried out in the Y direction, to processor p'. To be more specific, processor p provides processor p' with $(N_x \times N_y)/(P \times N_z)$ pieces of data with a Y coordinate $k_y$ satisfying the following relation:

$$(N_y/P) \times p' \leq k_y \leq (N_y/P) \times (p'+1)-1$$

The process to transfer such data is referred to as the permutation process.

<Transformation in the X Direction>

In the next processing 28, each processor carries out a transformation in the X direction on a data portion stored in a memory provided for the processor in accordance with Eq. (3).

<Transformation in the Z Direction>

In the next processing 29, each processor carries out a transformation in the Z direction on a data portion stored in a memory provided for the processor in accordance with Eq. (4). In the next processing 30, data obtained as results of the transformation is supplied to the output apparatus.

The conventional 3-dimensional fast Fourier transformation based on the permutation algorithm has been explained above. In accordance with this method of computation, however, each processor needs to transfer data to all other processors during the permutation process 27 in the course of the whole process as described in a paragraph with a title of 'Background of the Invention,' and such transfers of data become a bottleneck of the performance.

Figure 1:
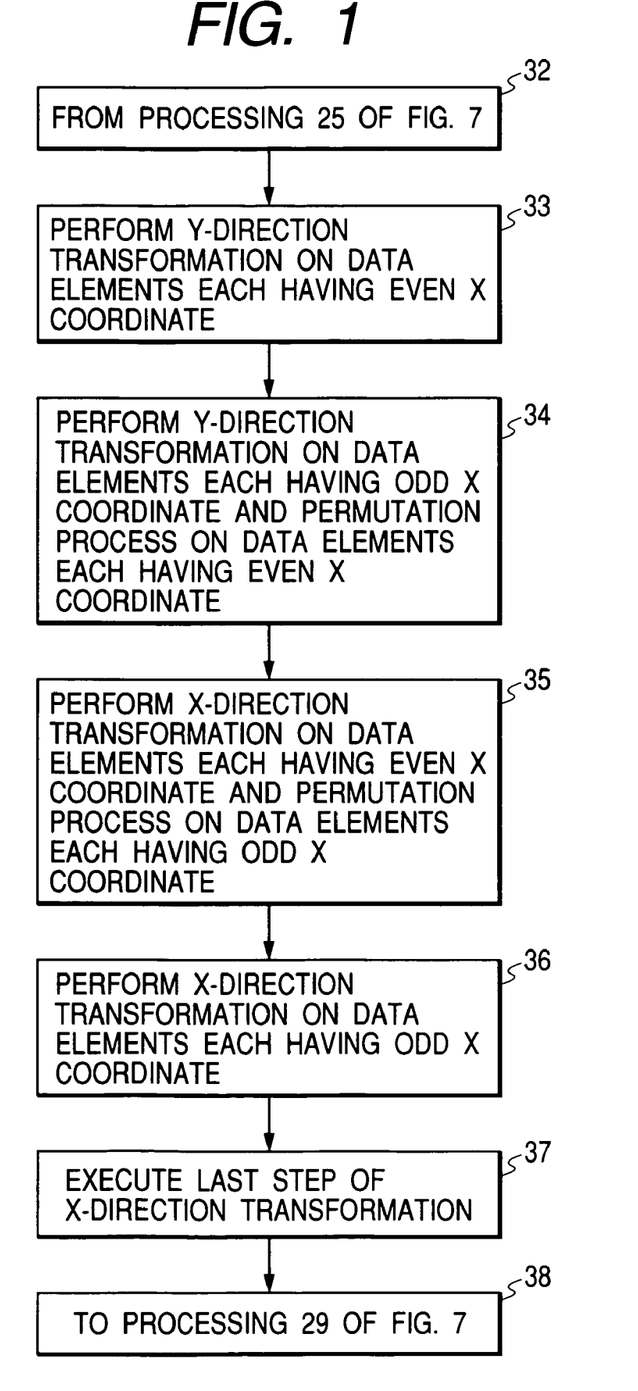
FIG. 1 shows a flowchart representing a computation technique of Y-direction and X-direction transformations adopting a parallel 3-dimensional fast Fourier transformation method according to the present invention.

(3) 3-Dimensional Parallel-Processing Fast Fourier Transformation Based on a Method According to the Invention In order to solve the problem cited above, in accordance with the present invention, the Y-direction and X-direction transformations based on the permutation algorithm are each split into two partial processes and the processing order is changed so as to allow communications and calculative processing to overlap each other. FIG. 1 shows a flowchart representing a computation process carried out in accordance with the present invention. In comparison with the conventional computation process based on the permutation algorithm as shown in FIG. 7, the computation process according to the present invention includes pieces of processing, which are identical with pieces of processing included in the flowchart shown in FIG. 7. The identical pieces of processing are the pieces of processing ending with processing 25 and the pieces of processing starting with processing 29. For this reason, the flowchart shown in FIG. 1 represents only pieces of processing between processing 25 and processing 29. In the computation process according to the present invention, there are five pieces of processing between processing 25 and processing 29. These pieces of processing are described as follows:

<Y-Direction Transformation Process (1)>

In processing 33 of the flowchart shown in FIG. 1, a Y-direction transformation according to Eq. (2) is carried out only on some of a data portion, which was obtained as a result of data division and stored in processing 25 of the flowchart shown in FIG. 7 in a memory provided for each of the processors in the distributed-memory configuration. To be more specific, the Y-direction transformation is carried out only on data elements each having an even X coordinate $j_x$. As described before, data to be subjected to transformation processes is arranged into a complex-data series forming a rectangular solid, and the complex-data series is then divided into as many data portions each located on a plane perpendicular to the Z axis as processors. Thus, since the complex-data series is not divided in the directions of the X and Y axes, the series forms a distributed layout that allows transformation processes in the X and Y directions to be completed without the need to transfer data between processors. In Y-direction transformation process (1), however, each of the processors carries out a transformation process in the Y direction only on some of the data portion, that is, only on data elements each having an even X coordinate jx.

<Y-Direction Transformation Process (2)>

In the next processing 34 of the flowchart shown in FIG. 1, each of the processors carries out a transformation process in the Y direction in accordance with Eq. (2) only on some of a data portion stored in its own memory. To be more specific, each processor carries out the Y-direction transformation process only on data elements each having an odd X coordinate $j_x$. Concurrently with the transformation process, a permutation process is carried out only on data elements each having an even X coordinate $j_x$ in the same way as the permutation process for the conventional method. In the permutation process, some of data owned each processor p is transferred from processor p to processor p'. To be more specific, processor p provides processor p' with $(N_x/2) \times (N_y/P) \times N_z$ data elements with a Y coordinate $k_y$ satisfying the following relation:

$$(N_y/P) \times p' \leq k_y \leq (N_y/P) \times (p'+1)-1$$

As a result of this permutation process, only data elements each having an even X coordinate $j_x$ are exchanged among the memories of the processors to be relocated in the memories.

Thus, in the resulting a state, each of the processors is capable of completing the transformation in the Z direction without transferring data between processors. As for the X direction, each of the processors is capable of executing all the steps of the transformation process except the last step, that is, each processor is capable of executing the first $\log_2 (N_x-1)$ steps of the transformation process carried out in the X direction, as processing performed on mutually adjacent data elements.

<X-Direction Transformation Process (1)>

In the next processing 35 of the flowchart shown in FIG. 1, each of the processors executes all steps of a transformation process carried out in the X direction except the last step in accordance with Eq. (5) given below as a substitute for Eq. (3) only on some of a data portion stored in its own memory.

$$c_{kx, ky, jz}^{(2')} = \sum_{jx'=0}^{Nx/2-1} c_{2jx', ky, jz}^{(1)} \exp(-2\pi i k_x 2 j_x'/N_x) \quad (5)$$

where symbol $k_x$ denotes every integer in the range 0, 1, . . . , $(N_x-1)$, symbol $k_y$ denotes every integer in the range 0, 1, . . . , $(N_y-1)$ and symbol $j_z$ denotes every integer in the range 0, 1, . . . , $(N_z-1)$. To be more specific, each processor executes the first $\log_2(N_x-1)$ steps of the transformation process carried out in the X direction only on data elements each having an even X coordinate $j_x$. Concurrently with the transformation process, a permutation process is carried out only on data elements each having an odd X coordinate $j_x$ in the same way as the permutation process for the conventional method. In the permutation process, some of data owned by each processor p is transferred from processor p to processor p'. To be more specific, processor p provides processor p' with $N_x/2 \times Ny/P \times Nz$ data elements with a Y coordinate $k_y$ satisfying the following relation:

$$(N_y/P) \times p' \leq k_y \leq (N_y/P) \times (p'+1)-1$$

Thus, the relocation of data results in a state in which, for data elements each having an odd X coordinate jx, each of the processors is capable of completing a transformation process in the Z direction and, as for the X direction, each of the processors is capable of executing all the steps of the transformation process except the last step, that is, each processor is capable of executing the first $\log_2(N_x-1)$ steps of the transformation process carried out in the X direction, as processing performed on mutually adjacent data elements.

<X-Direction Transformation Process (2)>

In the next processing 36 of the flowchart shown in FIG. 1, each of the processors executes all steps of a transformation process in the X direction except the last step in accordance with Eq. (6) given below as a substitute for Eq. (3) only on some of a data portion stored in its own memory.

$$c_{kx, ky, jz}^{(2'')} = \sum_{jx'=0}^{Nx/2-1} c_{2jx'+1, ky, jz}^{(1)} \exp(-2\pi i k_x (2j_x'+1)/N_x) \quad (6)$$

where symbol $k_x$ denotes every integer in the range 0, 1, ..., (N−1), symbol $k_y$ denotes every integer in the range 0, 1, ..., ($N_y$−1) and symbol $j_z$ denotes every integer in the range 0, 1, ..., ($N_z$−1). To be more specific, each processor executes the first $\log_2(N_x-1)$ steps of the transformation process carried out in the X direction only on data elements each having an odd X coordinate $j_x$.

<X-Direction Transformation Process (3)>

In the next processing 37 of the flowchart shown in FIG. 1, each of the processors executes the last step of the transformation process carried out in the X direction in accordance with Eq. (7) given below on a data portion stored in its own memory. Eq. (7) is derived by using $C_{kx, ky, jz}^{(2')}$ found by using Eq. (5) and $C_{kx, ky, jz}^{(2'')}$ found by using Eq. (6) as follows:

$$c_{kx, ky, jx}^{(2)} = c_{kx, ky, jz}^{(2')} + c_{kx, ky, jz}^{(2'')} \qquad (7)$$

where symbol $k_x$ denotes every integer in the range 0, 1, ..., (N−1), symbol $k_y$ denotes every integer in the range 0, 1, ..., ($N_y$−1) and symbol $j_z$ denotes every integer in the range 0, 1, ..., ($N_z$−1).

In Y-direction transformation process (2) according to the method of computation described above, each processor is capable of carrying out the transformation process in the Y direction only on data elements each having an odd X coordinate and a permutation process only on data elements each having an even X coordinate at the same time. In X-direction transformation process (1) according to the method of computation described above, on the other hand, each processor is capable of carrying out the transformation process in the X direction only on data elements each having an even X coordinate and a permutation process only on data elements each having an odd X coordinate at the same time. Thus, some or all of the transfer time can be concealed behind the processing time so that the efficiency of the computation can be increased.

(4) Parallel-Processing High-Speed Fourier Transformation Library

The following description explains a typical case in which the present invention is applied to a library implementing the 3-dimensional fast Fourier transformation by using a parallel-processing computer. The name of the library is FFT3D, and the library is executed on all specified processors running concurrently by the following call statement:

CALL FFT3D ($N_x$, $N_y$, $N_z$, P, F, TB, IOPT, IER)

where symbol $N_x$ denotes the number of pieces of 3-dimensional data to be subjected to a Fourier transformation carried out in the X direction, symbol $N_y$ denotes the number of pieces of 3-dimensional data to be subjected to a Fourier transformation carried out in the Y direction, symbol $N_z$ denotes the number of pieces of 3-dimensional data to be subjected to a Fourier transformation carried out in the Z direction, symbol P denotes the number of processors for carrying out the Fourier transformations, symbol F denotes an array for storing 3-dimensional data $\{f_{jx, jy, jz}\}$ to be subjected to Fourier transformations at an input time or Fourier-transformation results $\{C_{kx, ky, kz}\}$ at an output time, symbol TB denotes a table for storing computed values of a complex exponential function used in the Fourier transformations, symbol IOPT denotes an input argument specifying a function of the library as a function to be carried out in the execution of the library and symbol IER denotes an output indicating whether or not a run-time error has been generated in the execution of the library. The array F represents a partial array owned by each processor. Since the block division technique is applied to the input data with respect to the Z coordinate, processor p, where $0 \leq p \leq (P-1)$, serving as the pth processor has only $N_x \times N_y \times N_z/P$ pieces of data with a Z coordinate $j_z$ satisfying the relation $(N_z/P) \times p \leq j_z \leq (N_z/P) \times (p+1)-1$. That is to say, the array F assigned to the pth processor is used for storing data as expressed by the following equation:

$$F(j_x, j_y, j_z') = f_{jx, jy, (Nz/P) \cdot p + jz'} \qquad (8)$$

where symbol $j_x$ denotes every integer in the range 0, 1, ..., ($N_x$−1), symbol $j_y$ denotes every integer in the range 0, 1, ..., ($N_y$−1) and symbol $j_z'$ denotes every integer in the range 0, 1, ..., ($N_z/P$−1). Thus, the size of every array F assigned to a processor is $N_x \times N_y \times N_z/P$. The table TB is a table for storing values computed in the first call as values of a complex exponential function. These values of a complex exponential function can be reused in the second and subsequent calls so that the computation of the values does not need to be repeated. In the first call, the argument IOPT is set at 1 to indicate that a table is to be created as the table TB for storing computed values of a complex exponential function. In the second and subsequent calls, on the other hand, the argument IOPT is set at 2 to indicate that the computed values already stored in the table TB are to be used.

Figure 8:
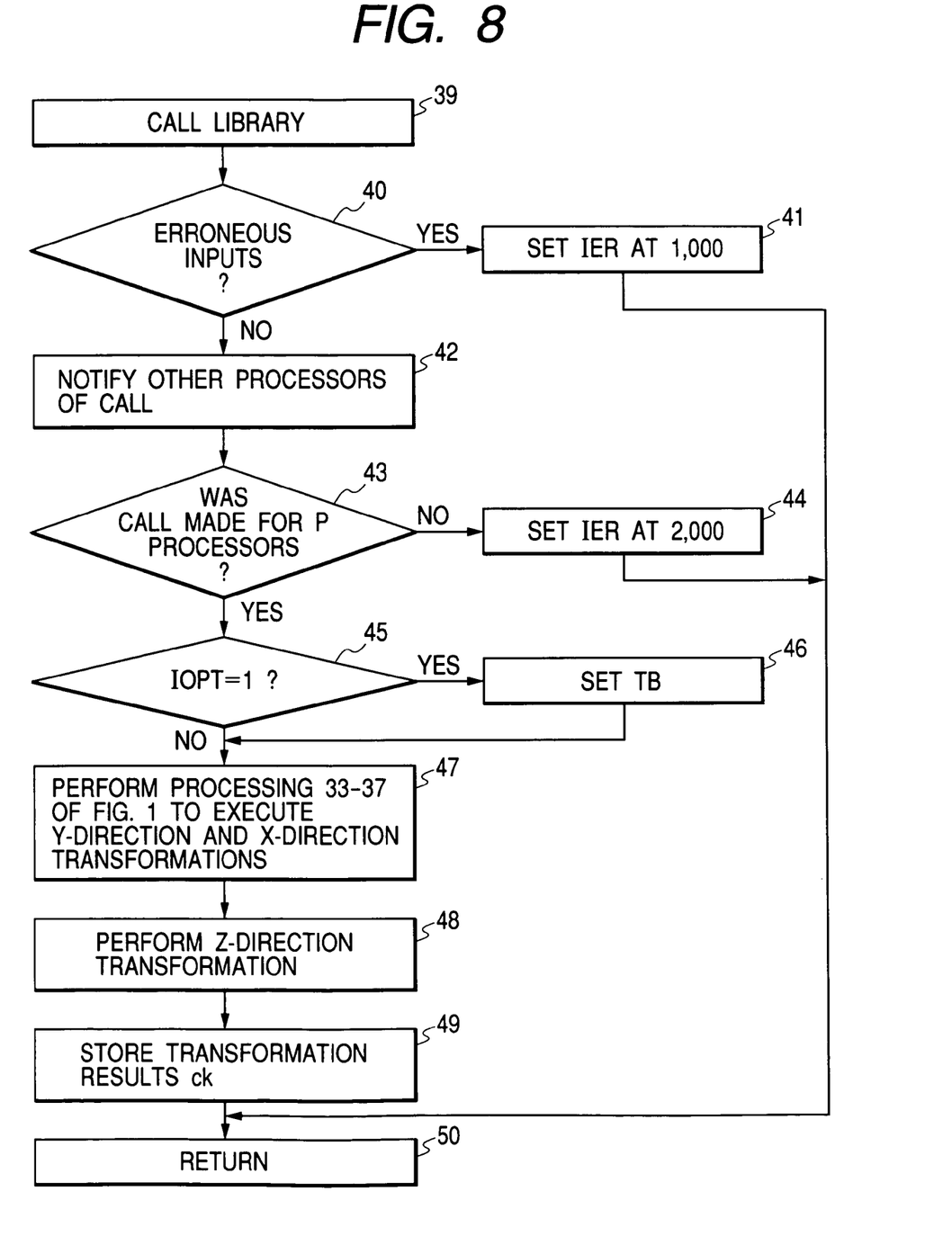
FIG. 8 shows a flowchart representing operations of a parallel 3-dimensional fast Fourier transformation library according to the present invention.

FIG. 8 shows a flowchart representing the operation of the library. When the library is called in processing 39, the library examines the validity of input arguments in the next processing 40. To put it concretely, for example, the library examines the arguments $N_x$, $N_y$, $N_z$ and P to confirm that they are each an integer, and examines the argument IOPT to confirm that its value is 1 or 2. If any of the input arguments has an invalid value, the flow of the operation goes on to processing 41 in which IER is set at 1,000. Then, control is returned to the calling program. If none of the input arguments has an invalid value, on the other hand, the flow of the operation goes on to processing 42 in which other processors are informed of this call. Then, the flow of the operation goes on to processing 43 determine whether or not the library has been called for P processors as specified by the argument P. If this condition is not satisfied, the flow of the operation goes on to processing 44 in which IER is set at 2,000. Then, control is returned to the calling program. If this condition is satisfied, on the other hand, the flow of the operation goes on to processing 45 in which the value of the argument IOPT is examined. If the value of the argument IOPT is 1, the flow of the operation goes on to processing 46 in which values of a complex exponential function used in the Fourier transformations in all directions are computed and stored in the table TB. Then, the flow of the operation goes on to processing 47.

If the value of the argument IOPT is 2, on the other hand, the flow of the operation goes on directly to the processing 47 in which transformation processes in the Y and X directions are carried out. These transformation processes are carried out in accordance with a method described in a paragraph included in the description of this embodiment as a paragraph with a title of '(3) 3-Dimensional Parallel-Processing Fast Fourier Transformation Based on a Method Provided by the Invention.' To put it concretely, these transformation processes are completed by sequentially carrying out five processes ranging from Y-direction transformation process (1) performed in the processing 33 of the flowchart shown in FIG. 1 to X-direction transformation process (3) performed in the processing 37 of the flowchart shown in FIG. 1. Then, in the next processing 48 of the flowchart shown in FIG. 8, a transformation process in the Z direction is carried out in accordance with a method described in a paragraph included in the description of this embodiment as a paragraph with a title of '(2) 3-Dimensional Parallel-Processing Fast Fourier Transformation Based on the Conventional Method.' At the end of this transformation process carried out in the Z direction, the 3-dimensional fast Fourier transformation processing is all completed. At the completion time, pieces of data obtained as a result of a block-division process carried out with respect to the Y coordinate are stored in the array F in the same way as the 3-dimensional parallel-processing fast Fourier transformation based on the conventional method. To put it concretely, in the next processing 49 of the flowchart shown in FIG. 8, the following pieces of data are stored in the array F assigned to the pth processor:

$$F(k_x, k_y', k_z) = c_{kx, (Ny/P)*p+ky', kz} \quad (9)$$

where symbol $k_x$ denotes every integer in the range 0, 1, ..., ($N_x$−1), symbol $k_y'$ denotes every integer in the range 0, 1, ..., ($N_y/P$−1) and symbol $k_z$ denotes every integer in the range 0, 1, ..., ($N_z$−1).

(5) Simulation Program

Figure 9:
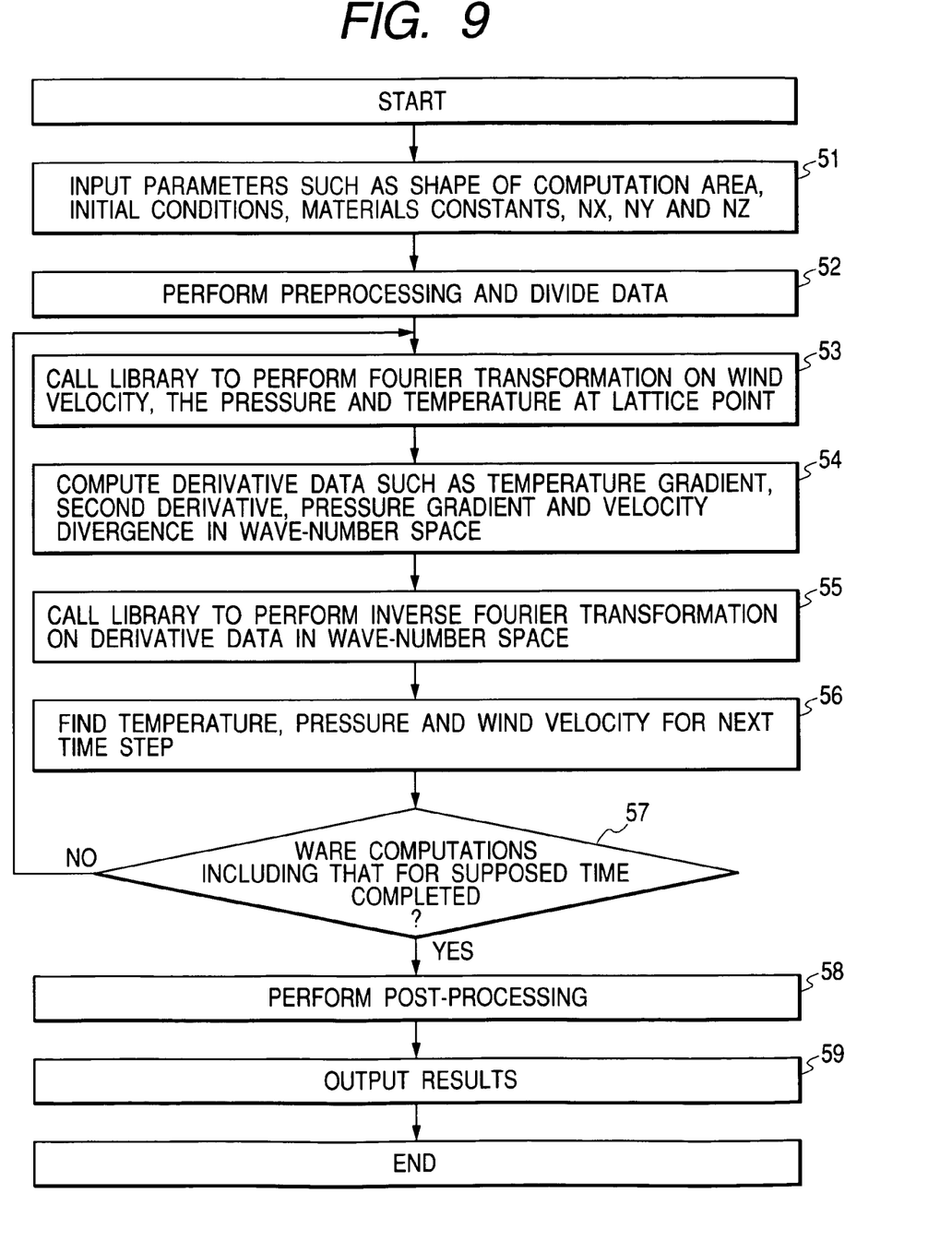
FIG. 9 shows a flowchart representing a weather forecast computation using the parallel-processing computer having a distributed-memory configuration according to the present invention.

FIG. 9 shows a flowchart representing a parallel-processing program developed for a weather calculation to be carried out in this embodiment. The following description explains a typical application of the program to a computation for 3-dimensional mesh with a size of $N_x \times N_y \times N_z$.

The flowchart representing the parallel-processing program begins with processing 51 in which the program inputs parameters, which include the sizes $N_x$, $N_y$ and $N_z$ of a computation area, initial conditions and material constants. The initial conditions include a temperature, a velocity of the wind and a pressure, whereas the material constants include mainly the thermal conductivity of the air. In addition, the program carries out preprocessing required for the computation. In this preprocessing, interpolations are carried out on the temperature, the velocity of the wind and the pressure, which have been obtained as a result of observation, in order to obtain data at mesh points as data required for the computation. Then, in the next processing 52, data including the temperature, the velocity of the wind and the pressure is distributed to processors employed in the parallel-processing computer. The distributed data is results of a block-division process carried out on input data in the Z direction. Thus, the distributed data allows the use of the 3-dimensional fast Fourier transformation library FFT3D described in the preceding paragraph.

After the pieces of processing 51 and 52 are finished, the flow of the program enters a loop to find quantities such as the temperature, the velocity of the wind and the pressure for a variety of time steps one after another. Equations serving as a fundamental are the following three equations:

An equation of motion for the velocity of the wind:

$$du/dt = -2\Omega \times u - (1/\rho)\nabla p + F_u \quad (10)$$

An equation for conservation of mass:

$$d\rho/dt = -\rho \nabla \cdot u \quad (11)$$

and

An equation expressing a change in temperature:

$$dT/dt = -\kappa \nabla^2 T + u \cdot \nabla T \quad (12)$$

where symbol u denotes the velocity of the wind, symbol p denotes the pressure, symbol T denotes the temperature, symbol $\Omega$ denotes Corioli's force, which is a force caused by the autorotation of the earth, symbol $F_u$ denotes other forces, symbol $\rho$ denotes the density of the air and symbol $\kappa$ denotes the thermal conductivity of the air. In order to find values of data for the next point of time from the above equations, first of all, in processing 53, the wind velocity u, the pressure p and the temperature T at a lattice point are transformed into pieces of data in a wave-number space by adopting the Fourier transformation. Then, in the next processing 54, these pieces of data in the wave-number space are differentiated. Subsequently, in the next processing 55, the pieces of data in the frequency space are reversely subjected to an inverse Fourier transformation process to find a temperature gradient $\nabla T$, a second derivative $\nabla^2 T$, a pressure gradient $\nabla p$ and a velocity divergence $\nabla \cdot u$. Then, in the next processing 56, these quantities are substituted into expressions on the right side of Eqs. (8) to (10) to find the wind velocity u, the pressure p and the temperature T for the next time step. The wind velocity u, the pressure p and the temperature T at a lattice point are transformed into pieces of data in a wave-number space by adopting the Fourier transformation as described above because, in this way, the derivatives can be found with a high degree of precision. In this program, the 3-dimensional Fourier transformation library FFT3D is applied to this part of the calculation.

In the next processing 57 at the end of the loop, the status of the computation is examined to determine whether or not the computation to find the quantities for all time steps ending at the supposed last point of time has been completed. If the computation has been completed, the flow of the program goes on to processing 58 in which post-processing is carried out. Then, in the next processing 59, results of the computation are output. In the post-processing, results are interpolated to find values for specific points, at which data is required, in a case mesh points of the computation are different from the specific points.

The above application has been explained by taking a calculation to forecast the whether as an example. It is obvious, however, that the technique provided by the present invention can also be adopted for other applications. For example, the technique can be applied to a simulation adopting the 3-dimensional fast Fourier transformation in a parallel-processing computer. In addition, in the application described above, prior to the Fourier transformation process, 3-dimensional data is subjected to a block-division process carried out in the Z direction but, after the Fourier transformation process, data is subjected to a block-division process carried out in the Y direction. It is obvious, however, that the technique provided by the present invention can also be adopted for applications in which, in place of the block-division processes, cyclic-division processes or block cyclic division processes are carried out. Furthermore, in the application described above, the transformation processes in the Y, X and Z directions are carried out in the Y→X→Z order. However, Y, X and Z are no more than names assigned to the axes of coordinates for the sake of convenience. Thus, it is obvious that the technique provided by the present invention can also be adopted in the same way for an application method in which, for example, the name Y is replaced by the name X (X→Y), the name Z is replaced by the name Y (Y→Z) and the name X is replaced by the name Z (Z→X).

Second Embodiment

As described above, in the first embodiment, a method of computation is adopted for the 3-dimensional Fourier transformation. However, this method of computation can also be applied to a 1-dimensional Fourier transformation. As is widely known, in order to apply the 1-dimensional Fourier transformation to data of N points, the data is arranged to form a rectangular solid with a size of $N_x \times N_y \times N_z$ where symbols $N_x$, $N_y$ and $N_z$ each denote any arbitrary integer and satisfy the relation $N_x \times N_y \times N_z = N$. Then, a 3-dimensional Fourier transmission adding a process referred to as a 'twist-coefficient multiplication' is carried out on the arranged data. The twist-coefficient multiplication is a process in which, after the Y-direction transformation according to Eq. (2), processing is carried out on the intermediate result $C_{jx, ky, jz}^{(1)}$ in accordance with Eq. (13) as follows:

<Y-direction transformation according to Eq. (2)>

$$c_{jx, ky, jz}^{(1)} := c_{jx, ky, jz}^{(1)} \times \exp(2\pi i k_y j_x/(N_x N_y)) \quad (13)$$

where symbol $j_x$ denotes every integer in the range $0, 1, \ldots, (N_x-1)$, symbol $k_y$ denotes every integer in the range $0, 1, \ldots, (N_y-1)$ and symbol $j_z$ denotes every integer in the range $0, 1, \ldots, (N_z-1)$. In addition, after the X-direction transformation according to Eq. (3), processing is carried out on the intermediate result $C_{kx, ky, jz}^{(2)}$ in accordance with the Eq. (14) as follows:

<X-direction transformation according to Eq. (3)>

$$c_{kx, ky, jz}^{(2)} = c_{kx, ky, jz}^{(2)} \times \exp(2\pi i (N_y k_x + k_y) j_z/(N_x N_y N_z)) \quad (14)$$

where symbol $k_x$ denotes every integer in the range $0, 1, \ldots, (N_x-1)$, symbol $k_y$ denotes every integer in the range $0, 1, \ldots, (N_y-1)$ and symbol $j_z$ denotes every integer in the range $0, 1, \ldots, (N_z-1)$. As described above, the twist-coefficient multiplication comprises independent pieces of processing carried out on data elements of the arrays $C_{jx, ky, jz}^{(1)}$ and $C_{kx, ky, jz}^{(2)}$. Thus, these pieces of processing can be incorporated respectively after the Y-direction transformation and the X-direction transformation in the method provided by the first embodiment. In this way, the equations provided by the present invention can also be applied to the 1-dimensional fast Fourier transformation.

Third Embodiment

The present invention can be further applied to a 2-dimensional fast Fourier transformation. The present invention is applied to the 2-dimensional fast Fourier transformation in the same way as the first embodiment except $N_z$ is set at 1.

In addition, in the case of the application to the 2-dimensional fast Fourier transformation, data serving as an object of the transformation is a complex-data array arranged 2-dimensionally in the directions of the X and Y axes. At a stage of a data-division process prior to 'Y-Direction Transformation Process (1)' explained in the description of the first embodiment, the complex-data array is divided into as many data portions each laid out on a plane perpendicular to the X axis as processors, and each of the data portions is stored in a memory provided for one of the processors in a distributed-memory configuration. Thus, the complex-data array is put in a state allowing a transformation in the Y direction to be completed without transferring data from one processor to another. In 'Y-Direction Transformation Process (1)', however, each of the processor carries out only a transformation in the Y direction on data elements each having an even X coordinate $j_x$. Then, in Y-Direction Transformation Process (2), each of the processor carries out a transformation in the Y direction only on data elements each having an odd X coordinate $j_x$, and concurrently with this Y-direction transformation, data elements each having an even X coordinate $j_x$ are relocated by being transferred among the processors in another rearrangement process. In this other rearrangement process, the complex-data array is divided into as many data portions each laid out along a straight line perpendicular to the X axis as the processors, and each of the data portions is stored in a memory provided for one of the processors in a distributed-memory configuration. As a result, each of the processors is capable of executing all steps of the transformation process carried out in the X direction except the last step, that is, each processor is capable of executing the first $\log_2(N_x-1)$ steps of the X-direction transformation. Furthermore, in X-Direction Transformation Process (1), each of the processors executes the first $\log_2(N_x-1)$ steps of the transformation carried out in the X direction on the relocated data elements each having an even X coordinate $j_x$, and data elements each having an odd X coordinate $j_x$ are relocated by being transferred among the processors concurrently with the execution of these first steps of the X-direction transformation. The data elements each having an odd X coordinate $j_x$ are rearranged for relocation in the same way as the other rearrangement process described above. Subsequently, the transformation processing is continued to X-Direction Transformation Process (2) and, then, to X-Direction Transformation Process (3) in exactly the same way as the first embodiment. Since the data serving as an object of transformation is 2-dimensional data, however, the transformation processing is ended with X-Direction Transformation Process (3).

Fourth Embodiment

The following description explains a computation of a structure of electrons in a semiconductor device or the like as another application carrying out a simulation by adoption of the fast Fourier transformation according to the present invention. In the computation of a structure of electrons, a wave function u(r) of electrons defined in a 3-dimensional mesh is computed in accordance with the following Schroedinger equation:

$$du(r)/dt = -(h^2/2m)\nabla^2 u(r) + (E - V(r))u(r) \quad (15)$$

where symbol h denotes Planck's constant, symbol m denotes the mass of an electron, symbol E denotes the energy level of the computed wave function and symbol V denotes a potential energy of other electrons and atoms in the crystal. The wave function is computed in order to find quantities such as the size of a band gap determining the properties of the semiconductor and the stability of the structure of a crystal.

In the computation of the expression on the right side of Eq. (15), a second derivative $\nabla^2 u(r)$ of the wave function is required. For the same reason as the one explained in the description of the weather-forecasting application, however, this portion is computed after u(r) is moved to the wave-number space by applying the Fourier transformation, and the result of the computation is returned back to the real space. Thus, when a structure of electrons is found by using a parallel-processing computer, the 3-dimensional fast Fourier transformation according to the present invention can be applied to this portion.

As described above, in accordance with the present invention, in the fast Fourier transformation implemented in a parallel-processing computer having a distributed-memory configuration, a data manipulation process and a data transfer process are carried out concurrently at the same time so that some or all the time it takes to carry out the latter process can be concealed behind the time required for performing the former process. Thus, by adoption of the method provided by the present invention, the efficiency of the processing parallelism can be increased over the processing efficiency of the conventional method. It is to be noted that, while the effect of the efficiency improvement much depends on the inter-processor communication performance displayed by the parallel-processing computer having a distributed-memory configuration, reduction of the execution time by about 20% to 30% can be expected for a case of solving a problem with a typical N value of $256^3$ by using 16 processors for example.

What is claimed is:

1. A method for improving efficiency in processing a data array in a parallel-processing computer having an input apparatus, a plurality of processors coupled with each other, an output apparatus, and an external storage apparatus, each of the processors having a memory, the method comprising the steps of:

dividing the data array into a plurality of data portions with at least one of the processors;

storing the plurality of data portions into any of said memories;

dividing said plurality of the data portions into a plurality of data parts;

determining whether each of the data parts is a first data part or a second data part based on order of each of the data parts in the data array, said first data part being even-numbered data of said data array in a direction of a second axis and said second data part being odd numbered data of said data array in the direction of said second axis;

carrying out first processing which is Fourier transformation of said first data part along a direction of a first axis with each processor while transferring the data parts among the processors;

relocating results of said first processing among the plurality of processors; and carrying out second processing which is a Fourier transformation of said second data part along the direction of said first axis with the each processor while transferring the relocated results among the processors.

2. A method according to claim 1, further comprising the step of relocating a result of the Fourier transformation of said second data part along the direction of said first axis among the plurality of processors, in parallel with the step of performing the Fourier transformation of said relocated results along the direction of the second axis.

3. A method according to claim 2, further comprising the steps of:

upon completion of the step of relocating a result of the Fourier transformation of said second data part along the direction of said first axis, carrying out along the direction of said second axis Fourier transformation of the relocated result of the Fourier transformation of said second data part along the direction of said first axis with the processors; and carrying out a final process of the Fourier transformation of the data array along the direction of said second axis with the processors by using both the result of the Fourier transformation of said second data part along the direction of said second axis and the result of the Fourier transformation on said first data part along the direction of said second axis.

4. A method for improving efficiency in processing a data array related to weather calculation and composed of three-dimensional data, in a parallel-processing computer having an input apparatus, a plurality of processors coupled with each other, an output apparatus, and an external storage apparatus, each of the processors having a memory, the method comprising the steps of:

dividing the data array into a plurality of data portions with the processors, each of the plurality of data portions being laid out on one of planes that are oriented perpendicularly to the direction of a Z axis, and arranged to form a rectangular solid having dimensions of (X, Y, Z) wherein $N_X$, $N_Y$, and $N_Z$ are side lengths of said rectangular solid in the directions of X, Y, and Z axes, respectively;

storing the plurality of data portions in said memories employed by the plurality of processors;

determining whether each data element in the data array along the direction of the Y axis has either an odd-numbered data X coordinate or an even-numbered X coordinate;

carrying out transformation processing only of data elements having even-numbered X coordinates in the data array along the direction of the Y axis with the processors;

carrying out transformation processing only of data elements having odd-numbered X coordinates in the data array along the direction of the Y axis with the processors, concurrently carrying out transfer processing of the data elements having even-numbered X coordinates in the data array so that transferred data elements are divided onto each one of planes that are oriented perpendicularly to the direction of the Y axis, and each one of the divided data elements is stored into the memories employed by the plurality of processors;

carrying out first ($\log_2 N_X - 1$) steps of transformation processing only of the data elements having even-numbered X coordinates in the data array along the direction of the X axis with the processors, concurrently carrying out a transfer processing of the data elements having even-numbered X coordinates in the data array so that the transferred data elements are divided onto each of planes that are oriented perpendicularly to the direction of the Y axis and each of the divided data elements is stored into the memories employed by the plurality of processors;

carrying out the first ($\log_2 N_X - 1$) steps of transformation processing only of the data elements having odd-numbered X coordinates in the data array along the direction of the X axis with the processors;

carrying out a last step of the transformation processing of the data elements in the data array along the direction of the X axis with the processor; and carrying out transformation processing of the data elements in the data array along the direction of the Z axis with the processors.

5. A method for improving efficiency in processing a data array having N points in a parallel-processing computer having an input apparatus, a processing apparatus that includes a plurality of processors, having one or more memories, an output apparatus, and an external storage apparatus, each of the processors having a memory, the method comprising the steps of:

dividing the data array into a plurality of data portions with the processors, each of the data portions being laid out on one of planes that are oriented perpendicularly to the direction of a Z axis, and arranged to form a rectangular solid having dimensions of $\{X, Y, Z\}$ wherein N, $N_X$, $N_Y$, and $N_Z$ are integers, $N_X$, $N_Y$, and $N_Z$ are side lengths of said rectangular solid in the directions of a X axis, a Y axis, and the Z axis, respectively, and a relation $N = N_X \times N_Y \times N_Z$ is satisfied;

storing the plurality of data portions in said memories employed by the plurality of processors;

determining whether data element in the data array along the direction of the Y axis has an odd-numbered data X coordinate or an even-numbered X coordinate;

carrying out transformation processing and twist-coefficient multiplication processing only of data elements having even-numbered X coordinates in the data array along the direction of the Y axis with the processors;

carrying out transformation processing and twist-coefficient multiplication processing only of data elements having odd-numbered X coordinates in the data array along the direction of the Y axis with the processors, concurrently carrying out transfer processing of the data elements having even-numbered X coordinates in the data array so that the transferred data elements are divided onto each one of planes that are oriented perpendicularly to the direction of the Y axis, and each one of the divided data elements is stored into the memories employed by the plurality of processors; carrying out first ($\log_2 N_X - 1$) steps of transformation processing only of the data elements having even-numbered X coordinates in the data array along the direction of the X axis, concurrently carrying out transfer processing of the data elements having even-numbered X coordinates in the data array with the processors so that the transferred data elements are divided onto each of planes that are oriented perpendicularly to the direction of the Y axis, and each of the divided data elements is stored into the memories employed by the plurality of processors;

carrying out the ($\log_2 N_X - 1$) steps of the transformation processing only of the data elements having odd-numbered X coordinates in the data array along the direction of the X axis with the processors;

carrying out a last step of the transformation processing of the data elements in the data array along the direction of the X axis with the processors; and carrying out transformation processing of the data elements in the data array along the direction of the Z axis with the processors.

6. A computer comprising:

a plurality of processors coupled with each other, each of the processors having a memory;

an input unit coupled with at least one of the processors; and an output unit coupled with at least one of the processors, wherein the input unit inputs a data array to at least one of the processors, at least one of the processors divides the data array into a plurality of data portions, stores the data portions to either of the memory, divides the data portion into a plurality of data parts, determines whether each of the data parts is either a first data part or a second data part on the basis of order of each of the data parts in the data array, said first data part being even-numbered data of the data array in a direction of a second axis and said second data part of said data portions being odd numbered data of the data array in the direction of said second axis, carries out first processing which is Fourier transformation of the first data part along a direction of a first axis while transferring the data parts among the processors, relocates a result of the first processing among the processors, and carries out second processing which is a Fourier transformation of the second part along the direction of the first axis while transferring the relocated results among the processors, and wherein the output unit outputs a result of the first processing and the second processing.

* * * * *